(12) United States Patent
Chrabieh et al.

(10) Patent No.: US 8,009,750 B2
(45) Date of Patent: Aug. 30, 2011

(54) RECEIVER WINDOW SHAPING IN OFDM TO MITIGATE NARROWBAND INTERFERENCE

(75) Inventors: Rabih Chrabieh, San Diego, CA (US); Samir S. Soliman, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 807 days.

(21) Appl. No.: 11/962,709

(22) Filed: Dec. 21, 2007

(65) Prior Publication Data

US 2009/0161804 A1     Jun. 25, 2009

(51) Int. Cl.
*H04L 27/28* (2006.01)
(52) U.S. Cl. ........................................................ 375/260
(58) Field of Classification Search .................. 375/260, 375/130, 136, 147, 316, 346; 370/203, 208, 370/210, 286
See application file for complete search history.

(56) References Cited

U.S. PATENT DOCUMENTS

| | | | |
|---|---|---|---|
| 5,357,502 A | | 10/1994 | Castelain et al. |
| 6,074,086 A | * | 6/2000 | Yonge, III ..................... 708/422 |
| 6,459,679 B1 | * | 10/2002 | Kim ............................... 370/208 |
| 2004/0022175 A1 | * | 2/2004 | Bolinth et al. ................ 370/203 |
| 2005/0036563 A1 | * | 2/2005 | Suzuki et al. ................. 375/260 |
| 2005/0100108 A1 | * | 5/2005 | Yun et al. ...................... 375/260 |

FOREIGN PATENT DOCUMENTS

WO     WO0223844     3/2002

OTHER PUBLICATIONS

International Search Report and Written Opinion—PCT/US2008/087801, International Search Authority—European Patent Office—Jun. 26, 2009.
Muschallik C:"Zeitfensterung Eines OFDM-Signals Zur Berbesserung Des Stoerabstands in Empfaenger Time-Windowing an OFDM Signal to Improve the Signal-To-Noise Ration the Receiver"Rundfunktechnische Mitteilungen,Mensing.Norderstedt vol. 40,No. 3,Sep. 1, 1996,XP000624656.

\* cited by examiner

*Primary Examiner* — Khai Tran
(74) *Attorney, Agent, or Firm* — Qualcomm Patent Group; Jonathan T. Velasco; James H. Yancey, Jr.

(57) ABSTRACT

A receiver window for symbol extraction is provided. A symbol is spread across a plurality of sub-carriers of a frequency band for transmission. If the frequency band is affected by narrowband interference, the receiver window concentrates the narrowband interference energy to minimize its effect on distant sub-carriers within the frequency band. The receiver window is shaped for extracting the symbol from the frequency band, wherein the receiver window has a starting point before the start of the symbol. The receiver window overlaps a previous receiver window for the previous adjacent symbol on the same frequency band. The receiver window is shaped by overlapping and adding a channel impulse response segment from a zero-padded portion of the symbol to the beginning of the symbol and overlapping and adding a second portion from the previous zero-padded symbol (from the same frequency band) to the end of the symbol.

33 Claims, 12 Drawing Sheets

RECEIVER WINDOW SHAPING IN OFDM TO MITIGATE NARROWBAND INTERFERENCE

BACKGROUND

1. Field

Various features pertain to wideband and ultra-wideband communication systems. At least one aspect pertains to eliminating or reducing the effects of frequency domain spreading of narrowband interference (NBI) in wideband and ultra-wideband communication systems.

2. Background

One modern transmission technique is known as Orthogonal Frequency-Division Multiplexing (OFDM) which uses orthogonality between a plurality of sub-carriers to make data sequences independent from each other. OFDM provides high spectral efficiency, can adapt to severe channel conditions without complex equalization, and is robust against narrow-band co-channel interference. Consequently, signal orthogonality can be maintained in the presence of multipath channels and linear filters. Because the plurality of orthogonal sub-carriers can use a lower symbol rate modulation, this eliminates intersymbol interference (ISI) to which a single, high symbol rate channel is susceptible.

OFDM may be implemented in wideband communication systems, such as ultra-wideband (UWB). UWB communication systems transmit information over a large bandwidth in a way that does not interfere with traditional narrowband communications. However, UWB transmissions are affected by narrowband interference (NBI). Such interference may be concentrated on one or two narrowbands or tones (for example). Filtering these narrowbands does not entirely cancel NBI. Windowing, such as a square or rectangular window function, is applied by a receiver in the time domain to obtain each OFDM symbol. However, while windowing is applied in the time domain of each OFDM symbol, the NBI spreads in frequency domain like a sinc function. That is, the NBI generates side lobes that decrease relatively slowly. Consequently, a larger portion of the bandwidth spectrum is affected by the side lobes than just the one or two narrowbands or tones.

Therefore, a method is needed that reduces or eliminates NBI within wideband or ultra-wideband communication systems.

SUMMARY

A method for receiver window shaping is provided for symbol extraction in the presence of narrowband interference (NBI). A wideband signal may be received carrying a symbol spread across a plurality of sub-carriers of a frequency band. A first receiver window is obtained for extracting the symbol, wherein the first receiver window has a starting point before the start of the symbol. A determination is made on whether the frequency band is significantly affected by narrowband interference. If the frequency band is significantly affected by narrowband interference, the symbol is extracted using the first window. The first receiver window may overlap with a previous window (for a previous adjacent symbol) in the same frequency band. The first receiver window is shaped to concentrate narrowband interference energy to a center frequency of the narrowband interference to reduce narrowband interference leakage to other sub-carriers in the frequency band.

Obtaining the first receiver window may include (a) shaping the first receiver window as a trapezoid window, (b) overlapping and adding a channel impulse response segment from the zero-padded portion of the symbol to the beginning of the symbol, (c) overlapping and adding a second portion from a previous zero-padded symbol to the end of the symbol, and/or (d) applying the first receiver window at the outer edges between the starting point and the end of a zero-padded portion of the symbol.

Obtaining the first receiver window may also include (a) shaping the first receiver window to minimize the total energy captured therein, (b) limiting the first receiver window size in the time domain so that it is zero outside the first window range, (c) shaping the first receiver window to include a substantially flat region in the time domain between the symbol edges for all samples in between the edges, (d) placing a stop band in the frequency domain for the first receiver window on interference side lobes below a certain level, and/or (e) keeping the total stop band energy of a sampled frequency in the frequency domain for the first receiver window below a particular threshold.

The one example, the first receiver window may include (a) a first decaying edge between the starting point and the start of the symbol, and/or (b) a second decaying edge in the zero padded portion of the symbol. The first decaying edge and second decaying edge may be symmetric or asymmetric.

A determination may be made on whether a first sub-carrier of the frequency band is significantly affected by a center frequency of the narrowband interference. If it has been significantly affected by the narrowband interference, the first sub-carrier is ignored.

The wideband signal may be an orthogonal frequency division multiplexing (OFDM) signal including an OFDM symbol spread across the plurality of sub-carriers of the frequency band. The frequency band includes a plurality of sequential zero-padded symbols, and the first receiver window overlaps a zero-padding portion of a previous symbol.

Additionally, a second receiver window may be obtained for extraction of the symbol in the frequency band if the frequency band is unaffected by narrowband interference. If the frequency band is unaffected by narrowband interference, the symbol is extracted using the second receiver window. The second receiver window may not overlap with a previous receiver window in the same frequency band.

A receiver module is also provided including a serial to parallel converter, and a window shaping module. The serial to parallel converter may be configured to receive a wideband signal carrying a symbol spread across a plurality of sub-carriers of a frequency band. The window shaping module may be configured to obtain a first receiver window for extracting the symbol, wherein the first receiver window has a starting point before the start of the symbol. The window shaping module is further configured to (a) determine whether the frequency band is significantly affected by narrowband interference, and (b) extract the symbol using the first window if the frequency band is significantly affected by narrowband interference. The first receiver window may overlap with a previous window in the same frequency band. The shape of the first receiver window may concentrate narrowband interference energy to a center frequency of the narrowband interference to reduce narrowband interference leakage to other sub-carriers in the frequency band.

In obtaining the first receiver window, the window shaping module may be further configured to (a) shape the first receiver window as a trapezoid window, (b) overlap and add a channel impulse response segment from a zero-padded portion of the symbol to the beginning of the symbol, (c) overlap and add a second portion from the previous zero-padded symbol to the end of the symbol, and/or (d) apply the first receiver window at the outer edges between the starting point and the end of the zero-padded portion of the symbol.

Additionally, in obtaining the first receiver window, the window shaping module may be further configured to (a) shape the first receiver window to minimize the total energy captured therein, (b) limit the first receiver window size in the time domain so that it is zero outside the first window range, (c) shape the first receiver window to include a substantially flat region in the time domain between the symbol edges for all samples in between the edges, (d) place a stop band in the frequency domain for the first receiver window on interference side lobes below a certain level, and/or (e) keep the total stop band energy of a sampled frequency in the frequency domain for the first receiver window below a particular threshold.

Moreover, in obtaining the first receiver window, the window shaping module may be further configured to (a) shape the first receiver window as a trapezoid window, (b) overlapping and adding a channel impulse response segment from the zero-padded portion of the symbol to the beginning of the symbol, (c) overlapping and adding a second portion from a previous zero-padded symbol to the end of the symbol, and/or (d) apply the first receiver window at the outer edges between the starting point and the end of a zero-padded portion of the symbol.

The window shaping module may be further configured to (a) obtain a second receiver window for extraction of the symbol in the frequency band if the frequency band is unaffected by narrowband interference, and/or (b) extract the symbol using the second receiver window if the frequency band is unaffected by narrowband interference. The second receiver window may be non-overlapping with a previous receiver window in the same frequency band.

Consequently, a receiver module is provided, comprising: (a) means for receiving a wideband signal carrying a symbol spread across a plurality of sub-carriers of a frequency band, and/or (b) means for obtaining a first receiver window for extracting the symbol, wherein the first receiver window has a starting point before the start of the symbol. The shape of the first receiver window may concentrate narrowband interference energy to a center frequency of the narrowband interference to reduce narrowband interference leakage to other sub-carriers in the frequency band.

The receiver module may further include: (a) means for shaping the first receiver window as a trapezoid window, (b) means for overlapping and adding a channel impulse response segment from a zero-padded portion of the symbol to the beginning of the symbol, (c) means for overlapping and adding a second portion from the previous zero-padded symbol to the end of the symbol, and/or (d) means for applying the first receiver window at the outer edges between the starting point and the end of the zero-padded portion of the symbol.

Additionally, the receiver module may also include: (a) means for shape the first receiver window to minimize the total energy captured therein, (b) means for limiting the first receiver window size in the time domain so that it is zero outside the first window range, (c) means for shaping the first receiver window to include a substantially flat region in the time domain between the symbol edges for all samples in between the edges, (d) means for placing a stop band in the frequency domain for the first receiver window on interference side lobes below a certain level, and/or (e) means for keeping the total stop band energy of a sampled frequency in the frequency domain for the first receiver window below a particular threshold.

A circuit may also be adapted to (a) receive a wideband signal carrying a symbol spread across a plurality of sub-carriers of a frequency band, and/or (b) obtain a first receiver window for extracting the symbol, wherein the first receiver window has a starting point before the start of the symbol. The shape of the first receiver window concentrates narrowband interference energy to a center frequency of the narrowband interference to reduce narrowband interference leakage to other sub-carriers in the frequency band.

A computer-readable medium is also provided comprising instructions for receiver window shaping for symbol extraction, which when executed by a processor causes the processor to (a) receive a wideband signal carrying a symbol spread across a plurality of sub-carriers of a frequency band, and/or (b) obtain a first receiver window for extracting the symbol, wherein the first receiver window has a starting point before the start of the symbol. Additionally, the computer-readable medium may also include instructions that (a) determine whether a first sub-carrier of the frequency band is significantly affected by a center frequency of the narrowband interference, and/or (b) ignore the first sub-carrier if it has been significantly affected by the narrowband interference.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

Figure 1:
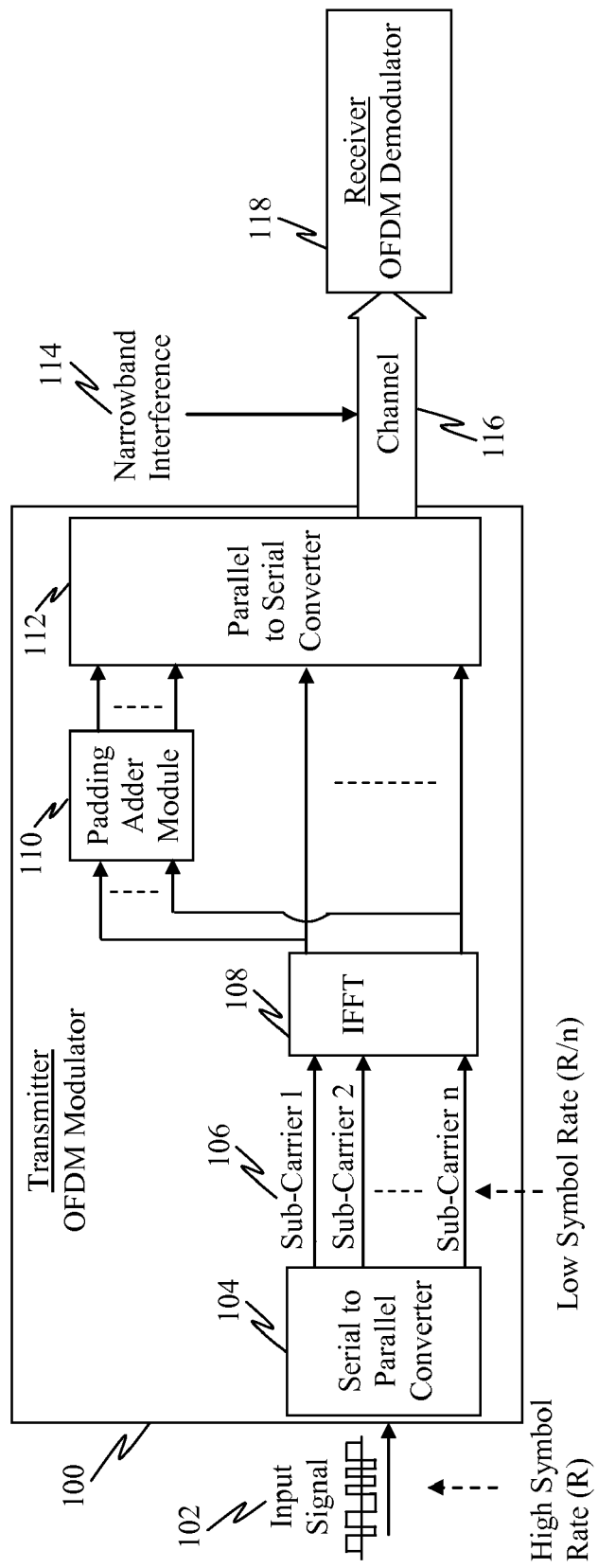
FIG. 1 illustrates a block diagram of an example of a transmitter module configured to function of an OFDM modulator.

In the following description, specific details are given to provide a thorough understanding of the examples, configurations, and/or embodiments. However, it will be understood by one of ordinary skill in the art that the examples, configurations, and/or embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the examples, configurations, and/or embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments and/or configurations may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In order to combat frequency domain spreading of narrowband interference (NBI) in wideband and ultra-wideband communication systems and focus the NBI energy on a few tones that can be filtered, erased, or ignored, one feature provides a method for shaping a receiver window rather than using a conventionally-shaped window. The receiver window shaping allows for devising optimum windows that minimize the standard deviation of the frequency response and given certain constraints.

In one example, OFDM may be implemented in wideband communication systems, such as ultra-wideband (UWB). In order to preserve the orthogonality of transmitted signals, the OFDM system may use either a prefix (e.g., a Cyclic Prefix (CP)) or postfix or suffix (e.g., Zero Padding (ZP)) having a length that accounts for the channel delay spread.

FIG. 1 illustrates a block diagram of an example of a transmitter module 100 configured to function of an OFDM modulator. An input signal 102 (e.g., digital bit stream) having a symbol rate R is received by a serial-to-parallel converter 104 which divides the input signal 102 into a plurality of multiple parallel channels or sub-carriers 106, each sub-carrier (parallel channel) having a symbol rate of R/n, where n is the number of sub-carriers (channels) in a frequency band. That is, symbols in the input signal 102 (e.g., digital bit stream) are divided among the plurality of sub-carriers 106 (parallel channels), wherein each sub-carrier has a different carrier frequency. Consequently, a symbol received in the input signal 102 is spread across the multiple sub-carriers 106 of a frequency band. An Inverse Fourier Transform (IFFT) module 108 then converts the signals in the plurality of sub-carriers 106 from the frequency domain to time domain signals.

In order to address the effects of multipath delay spread, a padding adder module 110 adds a guard period (using a prefix and/or postfix) to each symbol to be transmitted, which minimizes intersymbol interference between successive symbols. Cyclic Prefix (CP) (prefix) and Zero Padding (ZP) (postfix or suffix) are two common methods of adding a guard period to symbols. A Cyclic Prefix (CP) is a copy of the last part of the OFDM symbol which is prepended to the beginning of the transmitted symbol. Adding the CP effectively simulates a channel performing cyclic convolution, which implies orthogonality over dispersive channels when the CP is longer than the impulse response of the channel. In a Zero-Padding (ZP) suffix, a sequence of zeros (instead of a non-zero cyclic prefix) is appended to the end of the OFDM symbol.

A parallel-to-serial converter 112 receives the symbols on the sub-carriers (parallel channels) along with their corresponding padding and converts them into an ultra-wideband composite OFDM signal for transmission over an ultra wideband channel 116 (e.g., wired or wireless medium). The time-domain composite OFDM signal is the superposition of the sub-carrier signals therein. Accordingly, an OFDM signal may include an OFDM symbol and its padding that is spread across the sub-carriers of a frequency band and is transmitted over the ultra wideband channel 116 (which includes the frequency band).

The ultra wideband channel 116 (or frequency band therein) may be susceptible to narrowband interference (NBI) 114 which may affect one or more sub-carrier frequencies (of the frequency band), thereby affecting the OFDM signal. A receiver 118 may receive the OFDM signal and demodulates it to recover the OFDM symbol therein.

Figure 2:
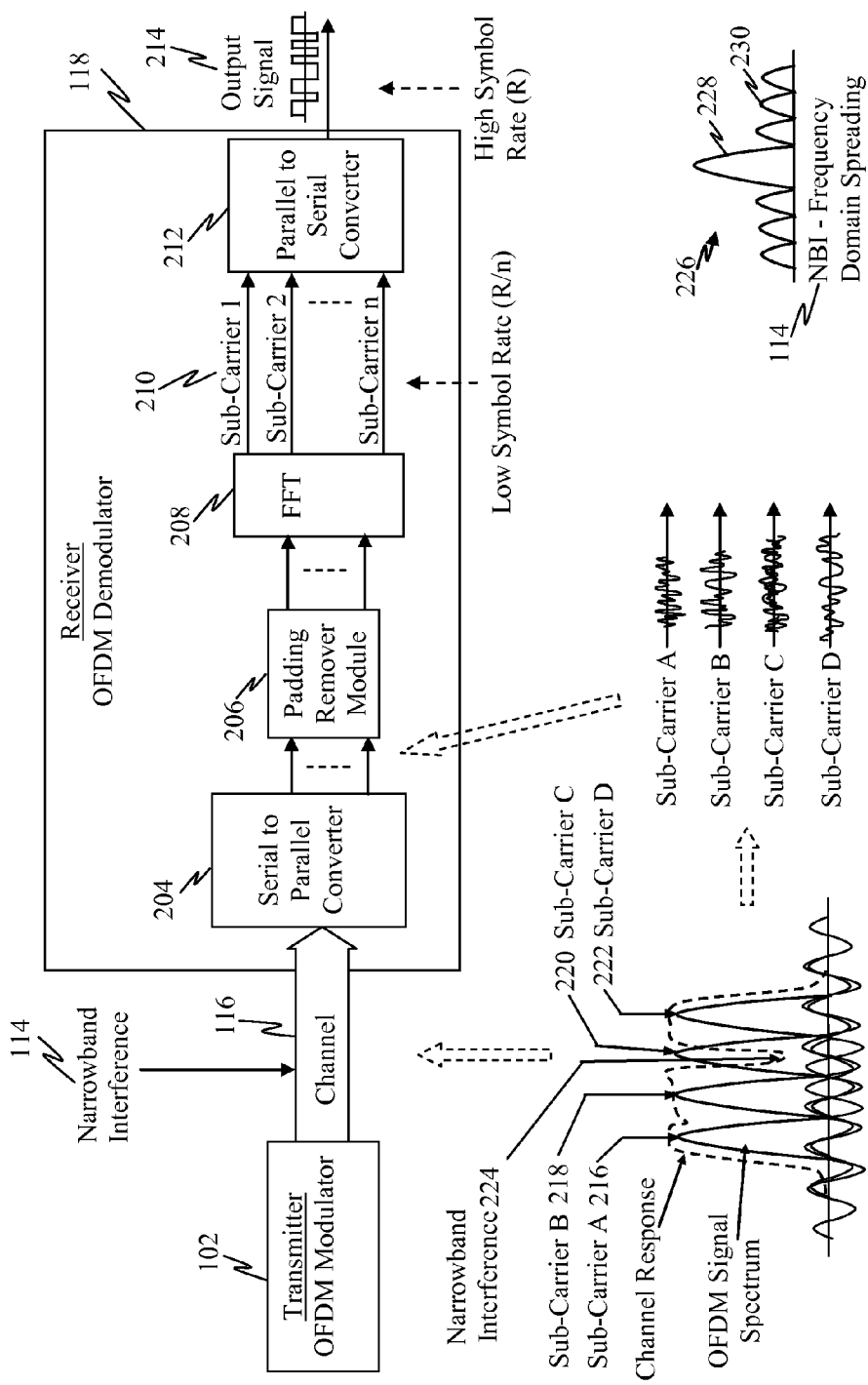
FIG. 2 illustrates a block diagram of an example of a receiver module configured to function as an OFDM demodulator.

FIG. 2 illustrates a block diagram of an example of a receiver module 118 configured to function as an OFDM demodulator. The receiver module 118 may receive a composite OFDM signal over an ultra-wideband channel 116 (e.g., wired or wireless medium). That is, the OFDM signal may include an OFDM symbol spread across a plurality of sub-carriers of a frequency band. A serial-to-parallel converter 204 samples the received time-domain composite OFDM signal to divide it into a plurality of sub-carriers (channels). A padding remover module 206 removes or cancels padding (e.g., CP or ZP) from the received OFDM symbol. A Fast Fourier Transform (FFT) module 208 then converts the OFDM symbol in the sub-carriers from the time domain back to the frequency domain. Each of the plurality of sub-carriers 210 may have a symbol rate of R/n. A parallelto-serial converter 212 then converts the plurality of sub-carriers (parallel channels) 210 into an output signal 214 (e.g., digital bit stream) having a symbol rate R.

In this example, the composite OFDM signal may include four sub-carriers 216, 218, 220, 222 (e.g., sub-carriers A, B, C, and D). Interference may be concentrated in one or two narrowbands. In this example, narrowband interference (NBI) 224 affects sub-carrier C 220. While the narrowband interference 224 may be filtered out or ignored, this does not entirely cancel NBI. In conventional receivers, windowing (e.g., a rectangular window function) is often applied in the time domain to obtain each OFDM symbol. However, while windowing is applied in the time domain to each received OFDM symbol, the NBI spreads in frequency domain like a sinc function 226. That is, in addition to an interfering center frequency 228, the NBI generates side lobes 230 that decrease relatively slowly. Consequently, a larger portion of the bandwidth spectrum (i.e., other sub-carriers of the affected frequency band) is affected by the side lobes 230 than just the one or two narrowbands, tones, or sub-carriers.

According to one example, a narrowband, tone, sub-carrier and/or frequency band is said to be affected (or significantly affected) by narrowband interference 224 if either the center frequency of the narrowband interference 224 or its side lobes tend to contain sufficient energy that it makes it difficult to perceive or detect desired signals at the narrowband, tone, sub-carrier and/or frequency band. For instance, if the energy of narrowband interference side lobes is at least fifty percent, eighty percent or exceeds the energy of the desired signal at a particular frequency band or tone, then it may be said to affect (or significantly affect) the desired signal.

While the interfering center frequency 228 can be filtered out or ignored, side lobe spreading is more difficult to contain. To address the effects of the side lobes generated by the NBI, different types of receiver windows may be used which are shaped to more quickly reduce the side lobes created by narrowband interference.

Figure 3:
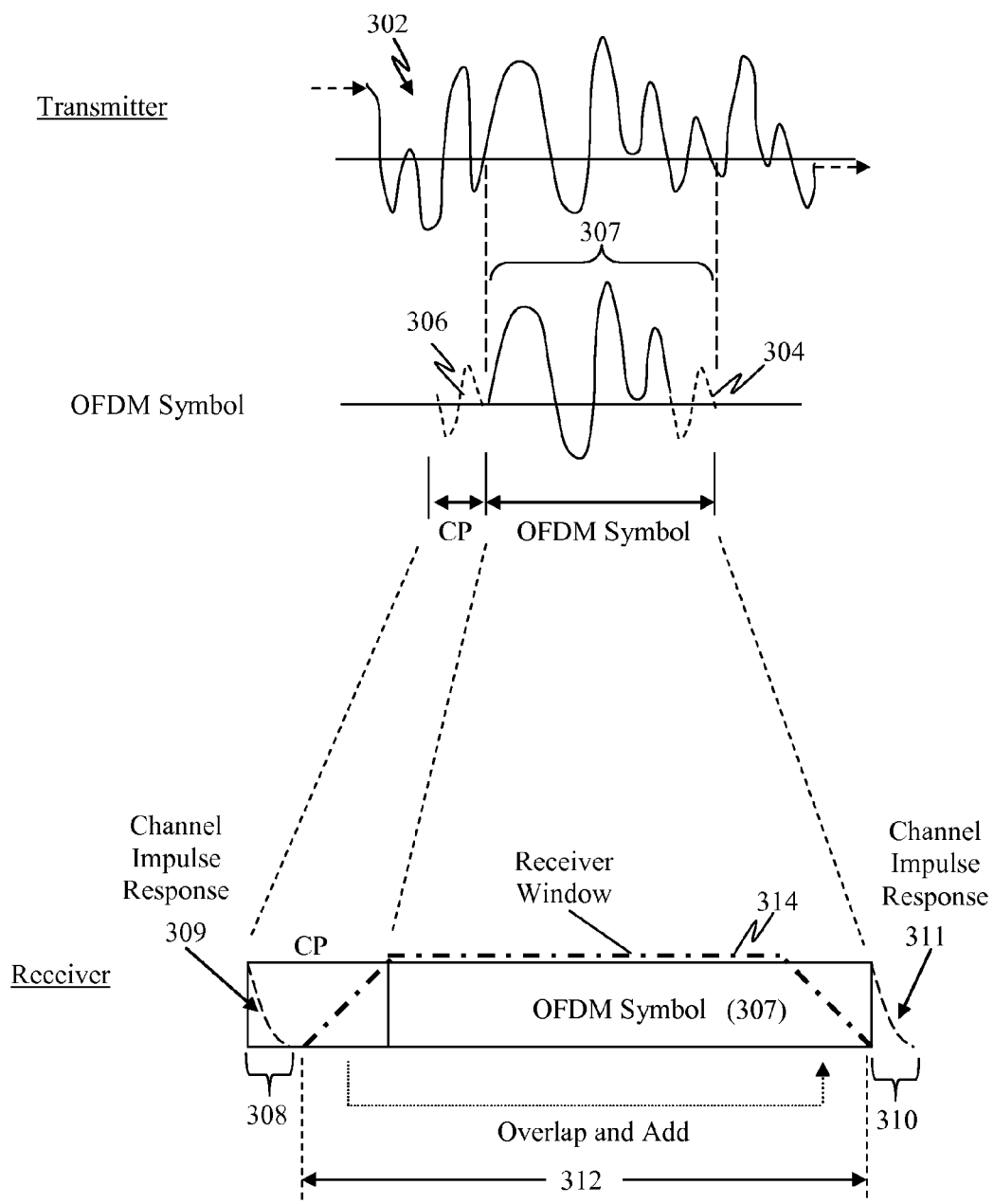
FIG. 3 illustrates one example of how windowing is applied to an OFDM symbol having cyclic prefix (CP).

FIG. 3 illustrates one example of how windowing is applied to an OFDM symbol having cyclic prefix (CP). A composite OFDM signal typically comprises a plurality of sub-carriers that are combined linearly to form a composite OFDM signal for transmission over a frequency band channel. Consequently, the OFDM signal carries an OFDM symbol spread across the plurality of carrier frequencies for a frequency band. For example, an OFDM signal 302 is illustrated as carrying an OFDM symbol 307 with a CP 306 pre-pended at the beginning of each OFDM symbol and contains a repetition of the last portion 304 in the OFDM symbol 307. The leftmost portion 308 of the CP 306 before the end of the channel 309 is unusable because it contains partial signal. The rightmost portion 310 of the channel 311 after the main OFDM symbol is also unusable. The segment (length) 312 from the end of the channel until the end of the main OFDM symbol 307 contains the full signal and is fully usable.

In the absence of NBI, it is enough to use the main OFDM symbol 307. A rectangular window may be applied at the edges of the OFDM symbol and send the resulting signal to the FFT 208 (FIG. 2).

However, in the presence of NBI it is preferable to shape the NBI using a window such as a trapezoidal window 314. Overlap and add (aliasing) is used in this case in order to maintain the same FFT size. Various Nyquist windows may be used, e.g. raised cosine, without distorting the main OFDM symbol provided that after the overlap and add operation (aliasing) the useful signal is properly reconstructed.

As the channel length increases, the margin for shaping decreases. The window shaping in time domain, before the aliasing operation is performed, results in a convolution in the frequency domain with an impulse response whose side lobes should decrease faster than a sinc. The aliasing operation is equivalent to a repetition, which is equivalent to a sampling of the frequency domain at the OFDM bin positions. The weaker the side lobes, the weaker their sampled values, and hence the weaker the narrowband noise on far tones.

Consequently, the receiver 118 (FIGS. 1 and 2) is normally arranged to demodulate a received OFDM signal after it has settled because this is when the frequencies become orthogonal to one another. The length of the CP is often equal to the guard interval between OFDM symbols.

Figure 4:
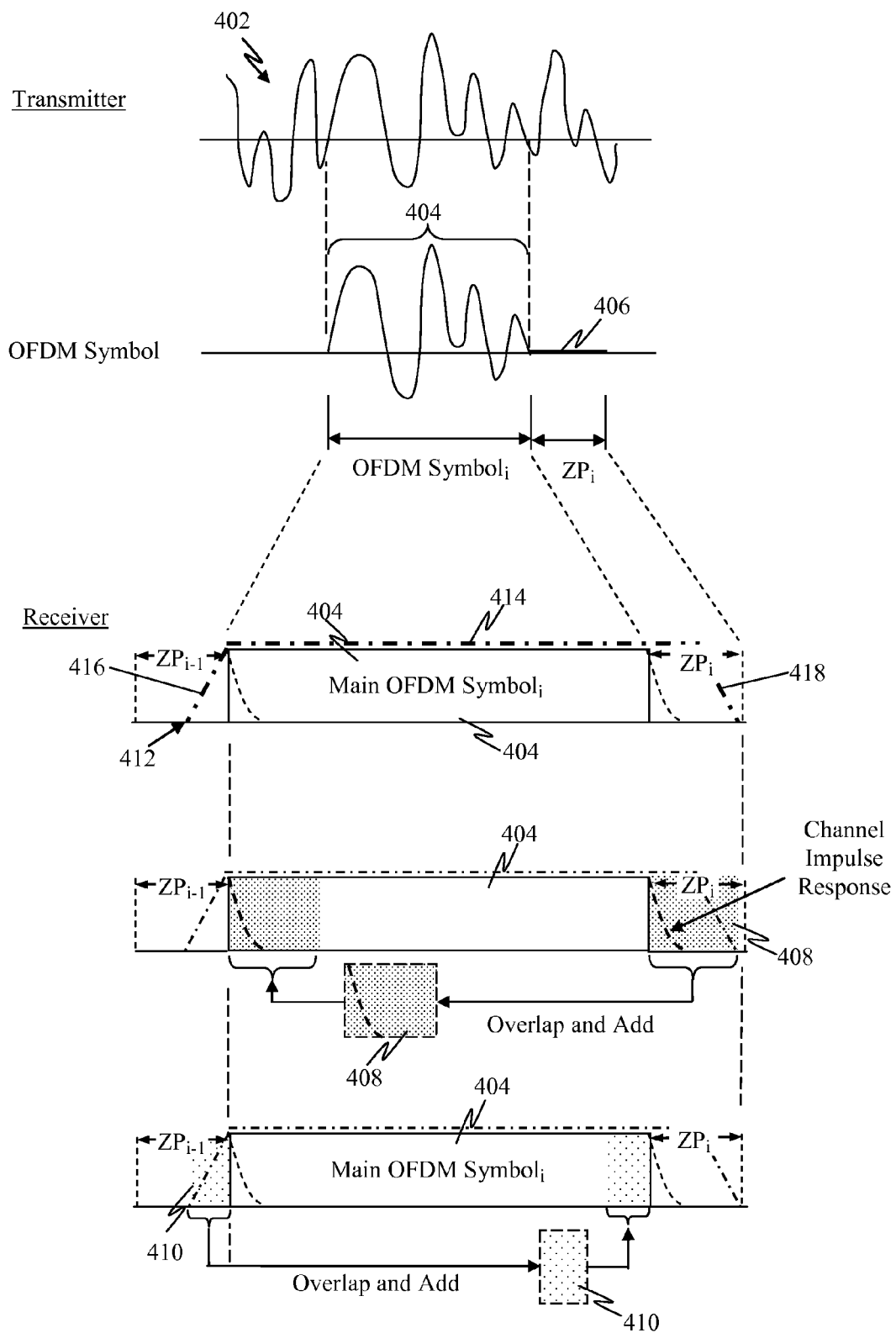
FIG. 4 illustrates one example of how windowing is applied to an ultra wideband signal having zero padding.

FIG. 4 illustrates one example of how windowing is applied to an ultra wideband signal having zero padding. In zero padding (ZP), one or more zeros are added to the end of an OFDM symbol. However, devising a receiver window for the ZP OFDM signals is a little more involved than the receiver window for CP OFDM signals.

Here, a sub-carrier OFDM signal 402 in Channel n is illustrated as carrying an OFDM symbol 404 with a ZP 406 appended at the end of each OFDM symbol 404 and containing one or more zeros.

According to one feature, a receiver window 414 is shaped by sliding the reference starting point of the OFDM symbol 404 forward to an early starting point 412 (i.e., before the start of the symbol), as if the $ZP_{i-1}$ is partially a zero prefix, then applying the shaped window 414 at the outer edges. The start of the receiver window 414 means that zero-padding is being shared (overlap) with adjoining symbols. This receiver window 414 does not alter the main OFDM symbol 404. For an OFDM symbol of the same length, the ZP receiver window 414 is wider than the CP receiver window 314 (FIG. 3).

Window shaping may occur before overlap-and-add operations. In this example, a first segment 408 (including a channel impulse response) from the zero-pad $ZP_i$ 406 of the OFDM symbol 404 is copied, overlapped, and added to the beginning of the OFDM symbol 404. In this example, the first segment 408 extends from the end of the OFDM symbol 404 to the end of the receiver window 414. Similarly, a second segment 410 from the previous zero-pad $ZP_{i-1}$ (before OFDM symbol 404) is copied, overlapped and added to the end of the OFDM symbol 404. This second segment 410 may extend from the starting point 412 of the receiver window 414 to the beginning of the OFDM symbol 404

These overlap-and-add operations seek to emulate periodic signals and channel. This is very similar to aliasing in the frequency domain below the Nyquist sampling frequency in which the spectrum repeats periodically and the aliased segments are added up.

This technique of sliding the reference starting point of the receiver window 414 assumes that the previous OFDM symbol is received in the same frequency band. That is, the region $ZP_{i-1}$ is captured or received on the same frequency band as the main OFDM symbol 404. Otherwise, if the previous symbol is received on a different frequency band, the region $ZP_{i-1}$ belongs to the different frequency band (different from the frequency band for the main OFDM symbol 404), thereby making the overlap-and-add operation of the second segment 410 useless.

The narrowband interference (e.g., a concentrated sine wave) is concentrated so that it looks like an impulse. In the prior art, when a square or rectangular window is applied (by convolution) at the receiver, it spreads the NBI impulse into side lobes that affect a wider range of sub-carriers (of a frequency band) than the original NBI. Thus, with conventional windowing approaches, the energy of the NBI spreads to other sub-carriers (e.g., tones).

The window shaping method described herein shapes the receiver window 404 so that its resulting side lobes will decay faster. By more slowly decaying the receiver window 404 in the time domain, the interfering side lobes decay faster in the frequency domain. By making the interfering side lobes reduce or decay faster (by window shaping), the interfering energy is concentrated in the main interfering lobe or center frequency for the NBI, making that worse, but removing it from the side lobes. By removing the energy from the side lobes, it reduces the effects of NBI on tones or sub-carriers of interest. Consequently, this approach widens the receiver window to bring in more interference but the energy for such interference is more focused on the center frequency for the NBI rather than its side lobes.

The window shaping approach illustrated in FIG. 4 applies a substantially trapezoidal shape to zero-padded symbols and virtually increases the length of the ZP for an interference affected frequency band. Such window shaping permits modifying the interfering side lobes outside the main symbol by extending receiver window instead of doing this inside the symbol, as in the case for CP. By performing the shaping outside the main symbol 404, the symbol 404 remains unchanged.

That is, for an interference-affected frequency band, rather than starting the receiver window at the start of the OFDM symbol, the starting point is moved forward (e.g., to starting point 412). The interference affected OFDM symbol (in the affected frequency band) sees a prolonged ZP and can use a wider window with smoother edges, and better performance. This technique can also be used in the case of CP with band hopping, however, some ISI may be introduced. Meanwhile, the switching points (starting receiver window points) for OFDM symbols that are unaffected by interference (i.e., symbols in unaffected frequency bands) move backward.

Note that by performing the two overlap and add operations (of segments 408 and 410) periodicity is added to the signal being sampled. Such periodicity means that when the signal is subsequently convolved with a window, periodic tones (e.g., signal of interest) are not changed but the non-periodic tones (e.g., interfering side lobes) are attenuated or reduced.

Shaping of the left and right edges 416 and 418 of the receiver window 414 is used to reduce and/or minimize the effects of NBI. By more slowly decaying the receiver window edges in the time domain, the interfering side lobes decay faster in the frequency domain. Note that the edges may be shaped to decay either linearly or non-linearly in the time domain to best reduce the effects of side lobes in the frequency domain. The left and right edges 416 and 418 of the window 414 do not have to be symmetrical since the useful signal (e.g., OFDM symbol 404) is unaffected by the windowing operation. For instance, it may be acceptable for the window 414 to extend a bit into the left edge of the main OFDM symbol 404 with little degradation in performance (although some noise may be added), or to extend a bit from the right edge where the channel has noticeably vanished.

Note that the overlap and add operations illustrated in FIG. 4 may be done as one operation (a unique block on one side of an OFDM symbol) or two different operations (two blocks, one from each side of the OFDM symbol). However, the reference of the OFDM symbol should be properly taken into account to prevent a phase rotation.

In various implementations, different receiver window shapes may be devised with narrow edges (sharp descent) and/or wide edges (slow descent). The window shapes may be pre-stored or dynamically generated by the receiver. Depending on the channel length, the appropriate window shape is applied.

Figure 5:
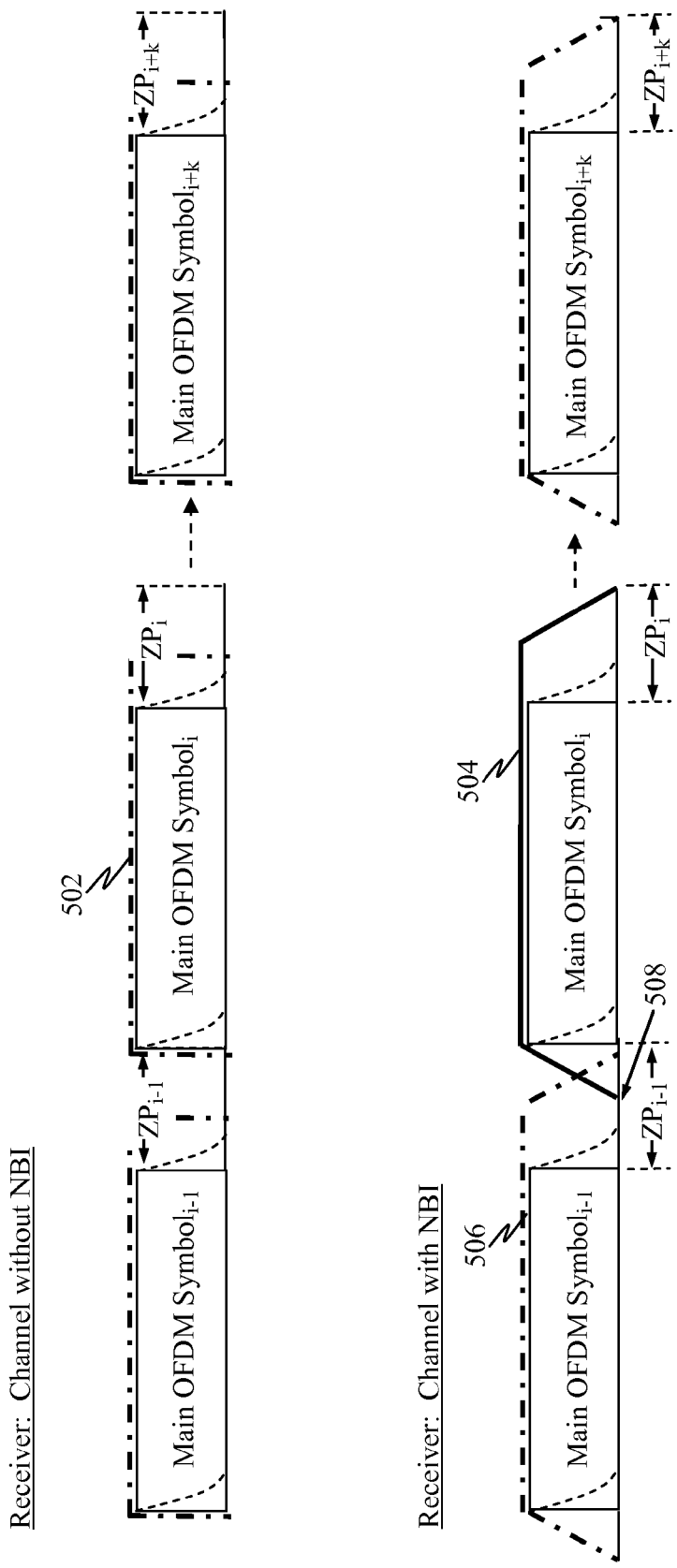
FIG. 5 illustrates an example of how different windowing schemes may be selectively applied to different channels depending on whether interference is detected on a particular channel.

FIG. 5 illustrates an example of how different windowing schemes may be selectively applied to different channels depending on whether interference is detected on a particular channel. For a frequency band (channel) where no significant narrowband interference is detected, a typical receiver window 502 (e.g., a rectangular or raised cosine window) may be applied to each successive zero-padded OFDM symbol to extract the original OFDM symbol. That is, window shaping is avoided when the symbol can be recovered without it.

On the other hand, if interference (e.g., from side lobes) is sensed on a particular frequency band (channel), a different windowing scheme is applied to minimize the effects of such interference. That is, if a symbol cannot be recovered due to interference, then window shaping is applied. The starting point 508 of the receiver window 504 is moved forward (relative to the typical receiver window 502) so that it overlaps with the zero padding portion $ZP_{i-1}$ of the previous OFDM symbol.

Figure 6:
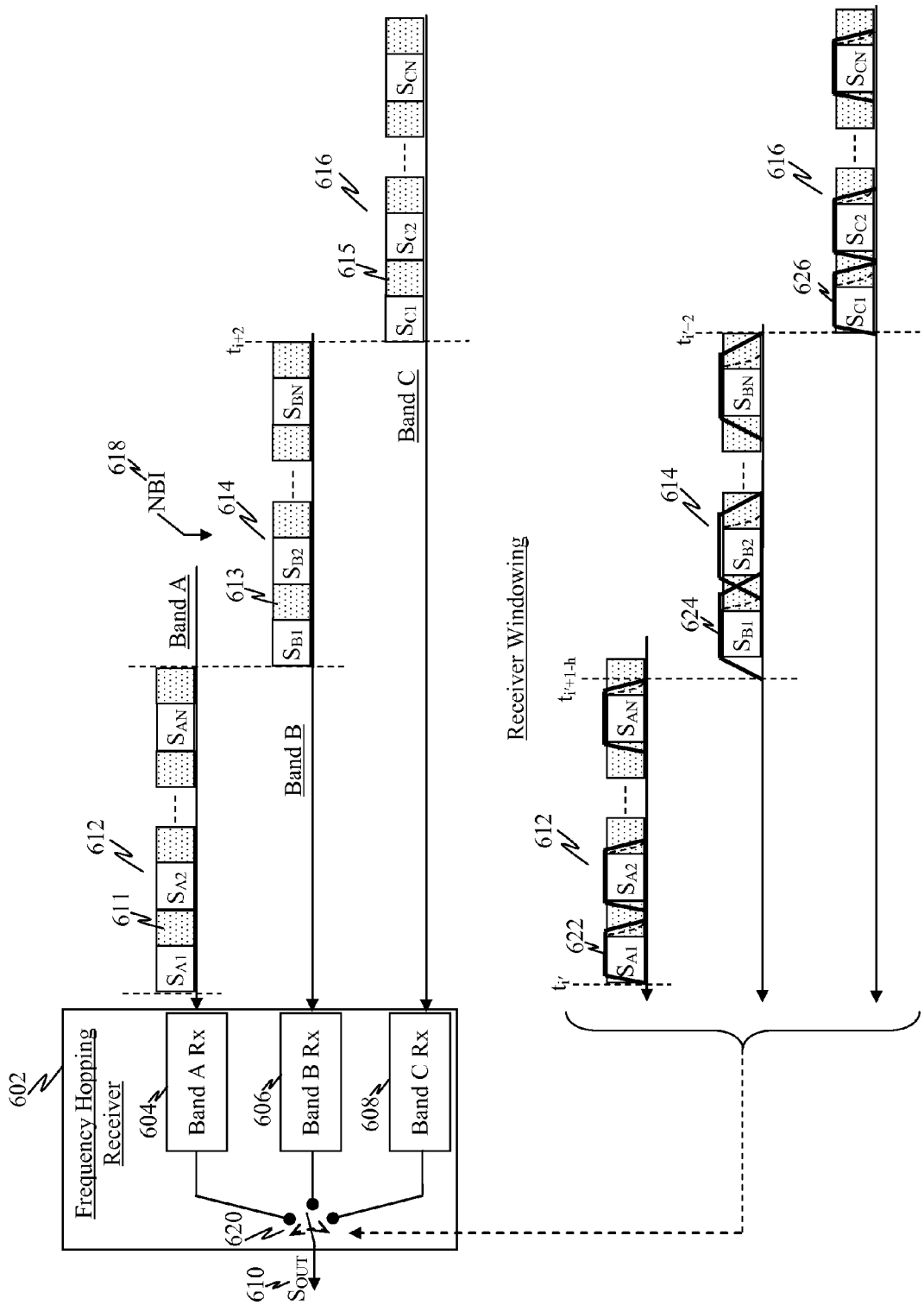
FIG. 6 illustrates an example of a frequency hopping receiver in which differential windowing may be employed depending on whether a particular frequency band is affected by narrow band interference.

FIG. 6 illustrates an example of a frequency hopping receiver in which differential windowing may be employed depending on whether a particular frequency band is affected by narrowband interference. According to one example, a narrowband, tone, sub-carrier and/or frequency band is said to be affected (or significantly affected) by narrowband interference if either the center frequency of the narrowband interference or its side lobes tend to contain sufficient energy that it makes it difficult to perceive or detect desired signals at the narrowband, tone, sub-carrier and/or frequency band. For instance, if the energy of narrowband interference side lobes is at least fifty percent, eighty percent or exceeds the energy of the desired signal at a particular frequency band or tone, then it may be said to affect (or significantly affect) the desired signal.

The frequency hopping receiver 602 includes a plurality of band receivers 604, 606, and 608 to receive transmitted symbols, and a switch 620 that selects one receiver at a time to hop between different frequency bands and provide a sequence $S_{OUT}$ 610 of symbols. In this example, a plurality of OFDM symbols may be transmitted on a particular frequency band before hopping to a different band. For instance, a sequence of OFDM symbols $S_{A1}$, $S_{A2}$, $S_{AN}$ 612 (and their corresponding zero-padding 611) are transmitted on a first frequency band (Band A) and received by the first receiver 604. The transmission may then hop to a second frequency band (Band B) and a sequence of OFDM symbols $S_{B1}$, $S_{B2}$, $S_{BN}$ 614 (and their corresponding zero-padding 613) are transmitted on the second frequency band (Band B) and received by the second receiver 606. The transmission may subsequently hop to a third frequency band (Band C) and a sequence of OFDM symbols $S_{C1}$, $S_{C2}$, $S_{CN}$ 616 (and their corresponding zero-padding 615) are transmitted on the third frequency band (Band C) and received by the third receiver 608. In this example, the second frequency band (Band B), where OFDM symbols $S_{B1}$, $S_{B2}$, $S_{BN}$ 614 are transmitted, may be affected by narrowband interference NBI 618.

The receiver 602 may be configured to apply different receiver windows depending on whether a frequency band is affected by narrowband interference. The receiver 602 may detect narrowband interference by sensing the energy levels across a frequency band. If an abnormally high amount of energy is sensed at a particular frequency or sub-carrier within the frequency band, it may filter or ignore the center frequency for the narrowband interference and minimize the effects of the narrowband interference side lobes on other sub-carriers within the frequency band. To minimize the effects of NBI side lobes on the other sub-carriers, the receiver 602 may implement a receiver window similar to that illustrated in FIG. 4.

In this example, both Band A and Band C are unaffected by narrowband interference and a first receiver window 622 and a second receiver window 626 may be applied to the received symbols in each respective frequency band. In implementing the first receiver window 622, it may be non-overlapping from symbol to symbol in the first frequency band (Band A). Similarly, the second receiver window 626 may be non-overlapping from symbol to symbol in the third frequency band (Band C). However, a different third receiver window 624 may be applied to the symbols $S_{B1}$, $S_{B2}$, $S_{BN}$ 614 at the receiver 602 in order to minimize the effects of NBI side lobes. The third receiver window 624 may be formed by moving the starting point of the receiver window forward and performing overlap-and-add operations as illustrated in FIG. 4. Because the starting point of the third receiver window 624 is moved forward (to time $t_{i'+1-h}$), the receiver 602 switches over from the first frequency band (Band A) to the second frequency band (Band B) early. That is, since the switching point is the same for both OFDM symbols (e.g., from symbol $S_{AN}$ to symbol $S_{B1}$) extending the receiver window 624 for symbol $S_{B1}$ means that the previous symbol $S_{AN}$ is shrunk.

On the other hand, for sequential symbols within the second frequency band (Band B) (i.e., no band hopping), the third receiver window 624 is extended virtually by overlapping the window from symbol to symbol using the zero-padding of the previous symbol in the same frequency band.

Consequently, some symbols in unaffected frequency bands (e.g., Band A) may be shrunk (e.g., its receiver window $S_{AN}$ is shortened) while symbols in an affected frequency band (e.g., Band B) are prolonged or stretched (e.g., its receiver windows $S_{B1}$, $S_{B2}$, $S_{BN}$ are prolonged), thereby capturing more interference but focusing such captured interference around the center frequency of the narrowband interference NBI 618.

Receiver Window Examples

Figure 7:
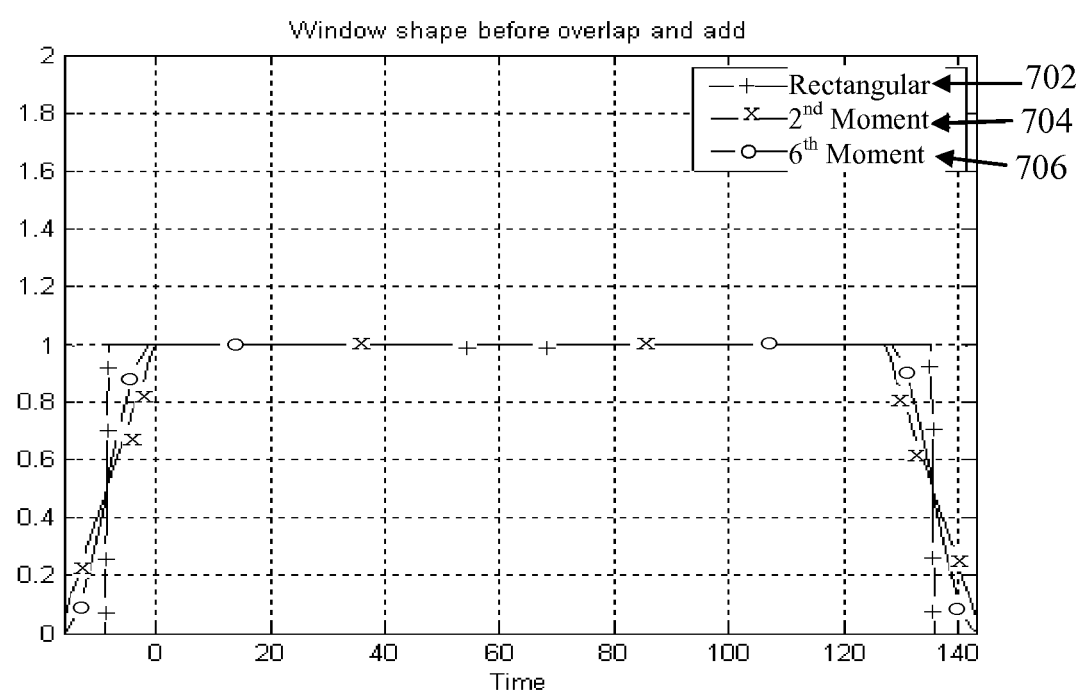
FIG. 7 illustrates a graph of examples of shaping windows in the time domain before applying overlapping and adding at a receiver.

FIG. 7 illustrates a graph of examples of shaping windows in the time domain before applying overlapping and adding at a receiver. These may be non-optimal shaping windows but optimal windows can be designed to minimize the per-tone leakage (from side lobes of a NBI center frequency) as well as the total leakage. Such shaping windows may be designed like a finite impulse response (FIR) with a flat stop band, for example, in order to uniformly spread the leakage from side lobes of narrowband interference (NBI) center frequency. Additional constraints may be applied on the receiver window to ensure that for every NBI center frequency, the total leakage (from side lobes) is about the same.

For the purpose of this example, relatively simple windows are obtained, a rectangular window 702, a $2^{nd}$ moment window, and a $6^{th}$ moment window. The $2^{nd}$ moment window and $6^{th}$ moment window are obtained by minimizing the standard deviation of the impulse response in the frequency domain. In other words, the $2^{nd}$ moment window is obtained by minimizing the $2^{nd}$ moment and the $6^{th}$ moment window is obtained by minimizing the $6^{th}$ moment. The use of the $2^{nd}$ moment window 704 and $6^{th}$ moment window 706 cause side lobes (from a narrowband interference) to decrease slower then faster than the use of the rectangular window 702. The time reference of zero denotes the start of the main OFDM symbol.

In this example, an OFDM symbol length of 128 samples is assumed, a ZP length of 32 samples (i.e., total symbol+ZP length is 160), and a channel length of 16 samples long. Thus, the available sample length for performing window shaping is the ZP length (32 samples) minus the channel length (16 samples) is sixteen (16) samples total (i.e., 32 samples–16 samples=16 samples available). In these examples, the sixteen (16) samples available for window shaping are divided into two parts, with eight (8) samples for shaping on each side of the window (symmetric window).

According to one feature, shaping of the edges of a receiver window is used to reduce and/or minimize the effects of NBI. By more slowly decaying the receiver window edges in the time domain, the interfering side lobes decay faster in the frequency domain. Note that the edges may be shaped to decay either linearly or non-linearly in the time domain to best reduce the effects of side lobes in the frequency domain. The edges of a receiver window may be either symmetric or asymmetric to achieve the improved or optimized reduction of side lobes.

Figure 8:
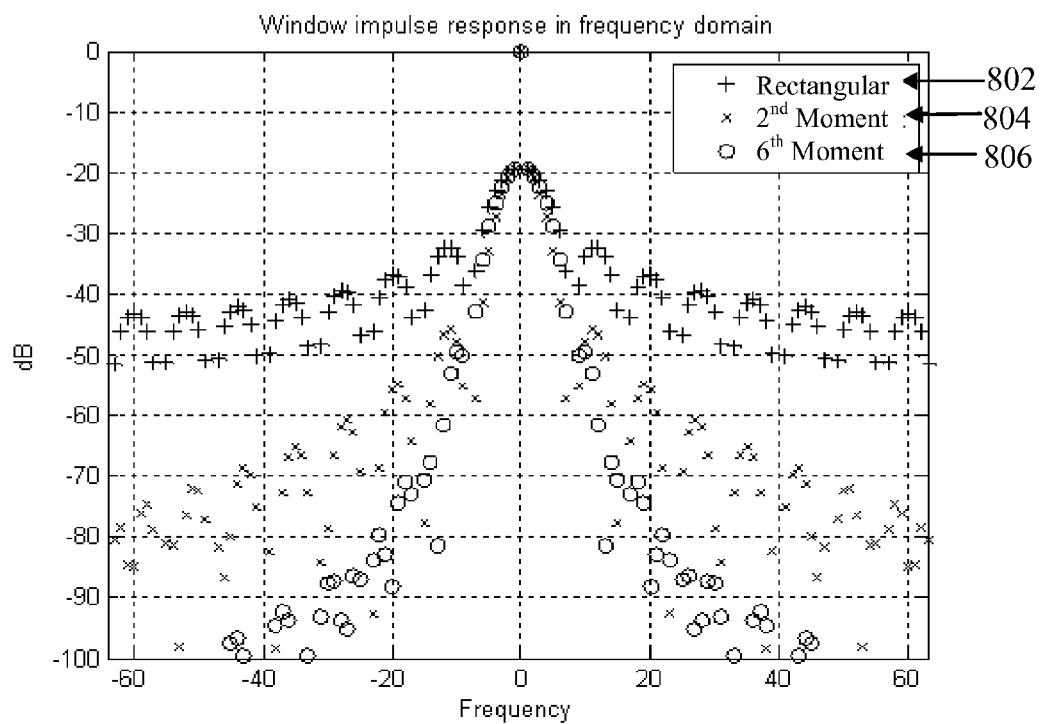
FIG. 8 illustrates the frequency domain impulse response of the receiver windows illustrated in FIG. 7.
Figure 9:
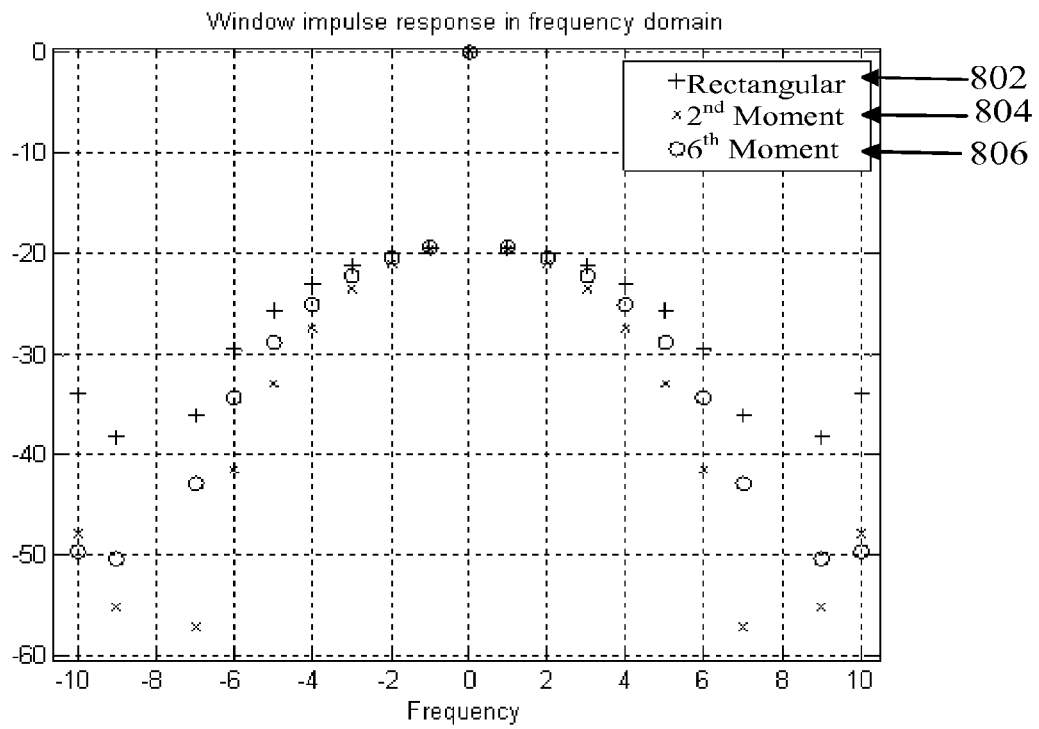
FIG. 9 illustrates a magnified graph of the frequency domain impulse response of FIG. 8.

FIG. 8 illustrates the frequency domain impulse response of the receiver windows illustrated in FIG. 7 after overlap and add operations. FIG. 9 illustrates a magnified graph of the frequency domain impulse response of FIG. 8. As can be appreciated from FIG. 8, the interference leakage (from side lobes) for the rectangular window 802 is the worst. The interference leakage for the minimum $6^{th}$ moment window 806 significantly decays as it moves farther away from the center frequency (i.e., frequency 0). However, as can be appreciated from FIG. 9, the minimum $2^{nd}$ moment window 804 has less leakage near the center frequency (i.e., frequency 0).

FIGS. 8 and 9 illustrate the particular case of a zero frequency interferer and after the overlap-and-add operations have been performed on a zero-padded symbol. However, similar graphs are obtained for various frequency values, either before or after the overlap operation.

Example—Window Shaping Method

There are various ways to shape a receiver window. One very simple and near optimum receiver window is a trapezoidal window with linear edges. The slope of the linear edges can be easily and dynamically adapted to any edge size. By more slowly decaying the receiver window edges in the time domain, the interfering side lobes decay faster in the frequency domain. By making the interfering side lobes decay faster, the interfering energy is concentrated in the main interfering lobe or center frequency for the NBI, making that worse, but removing it from the side lobes.

Figure 10:
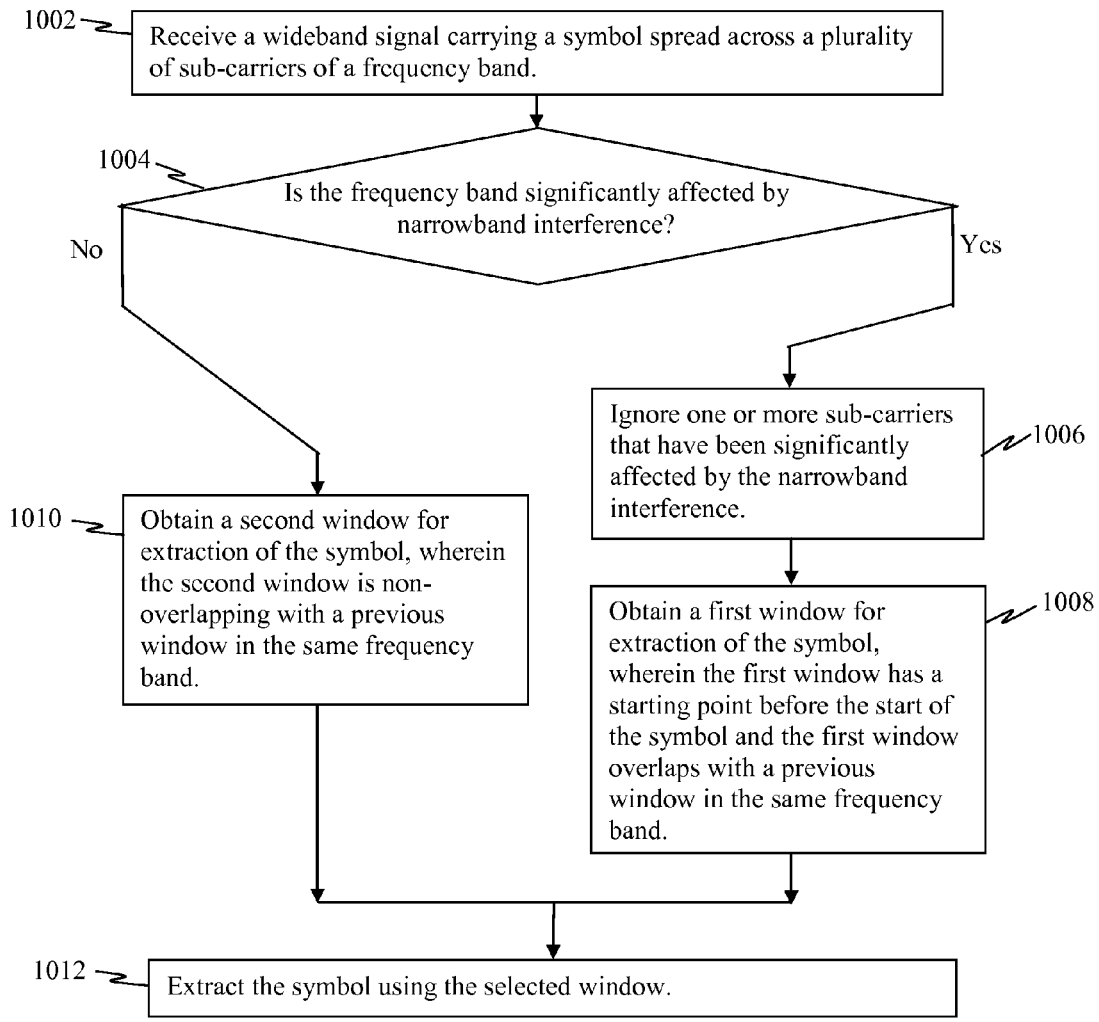
FIG. 10 illustrates a method operational in a receiver for window shaping as part of a zero-padded symbol extraction processes.

FIG. 10 illustrates a method operational in a receiver for window shaping as part of a zero-padded symbol extraction processes. In one example, the zero-padded symbols may be OFDM symbols. An ultra wideband or wideband signal carrying a symbol (e.g., OFDM symbol) is received spread across a plurality of sub-carriers of a frequency band 1002. That is, an OFDM symbol may be spread across the sub-carriers of the frequency band during transmission. A determination is made as to whether the frequency band (or a sub-carrier therein) is significantly affected by (a center frequency of) narrowband interference 1004. For instance, if an abnormally high energy or power is detected at a particular sub-carrier of the frequency band, it may be assumed that that sub-carrier is affected by NBI and, therefore, the desired signal in that sub-carrier is likely overwhelmed. According to one example, a narrowband, tone, sub-carrier and/or frequency band is said to be affected (or significantly affected) by narrowband interference 224 if either the center frequency of the narrowband interference 224 or its side lobes tend to contain sufficient energy that it makes it difficult to perceive or detect desired signals at the narrowband, tone, sub-carrier and/or frequency band. For instance, if the energy of narrowband interference side lobes is at least fifty percent, eighty percent or exceeds the energy of the desired signal at a particular frequency band or tone, then it may be said to affect (or significantly affect) the desired signal.

If it is determined that narrowband interference is affecting the frequency band (or one or more sub-carriers therein), one or more sub-carriers significantly affected by the narrowband interference may be ignored 1006. That is, the one or more sub-carrier frequencies coinciding with the center frequency of the narrowband interference are filtered or ignored. A first window for extraction of the symbol is then obtained, wherein the first window has a starting point before the start of the symbol and the first window overlaps with a previous window in the same frequency band 1008. The first receiver window may extend across the frequency band to capture more interference in the frequency band. For example, the first receiver window may be similar to receiver window 504 in FIG. 5, in which the zero-padding edge segments (where no useful signals are found) may capture more interference. Although more interference may be captured by the prolonged receiver window 504 (FIG. 5), due to the shaping of its edges, the receiver window 504 may focus the energy of such interference (e.g., side lobes of frequency-domain) around the center frequency for the NBI.

Otherwise, if the frequency band is not affected by narrowband interference, a second window is shaped for extraction of the symbol, wherein the second window is non-overlapping with a previous window in the same frequency band 1010. The symbol can then be extracted using the selected window 1012. For example, the second receiver window may be similar to receiver window 502 in FIG. 5.

Figure 11:
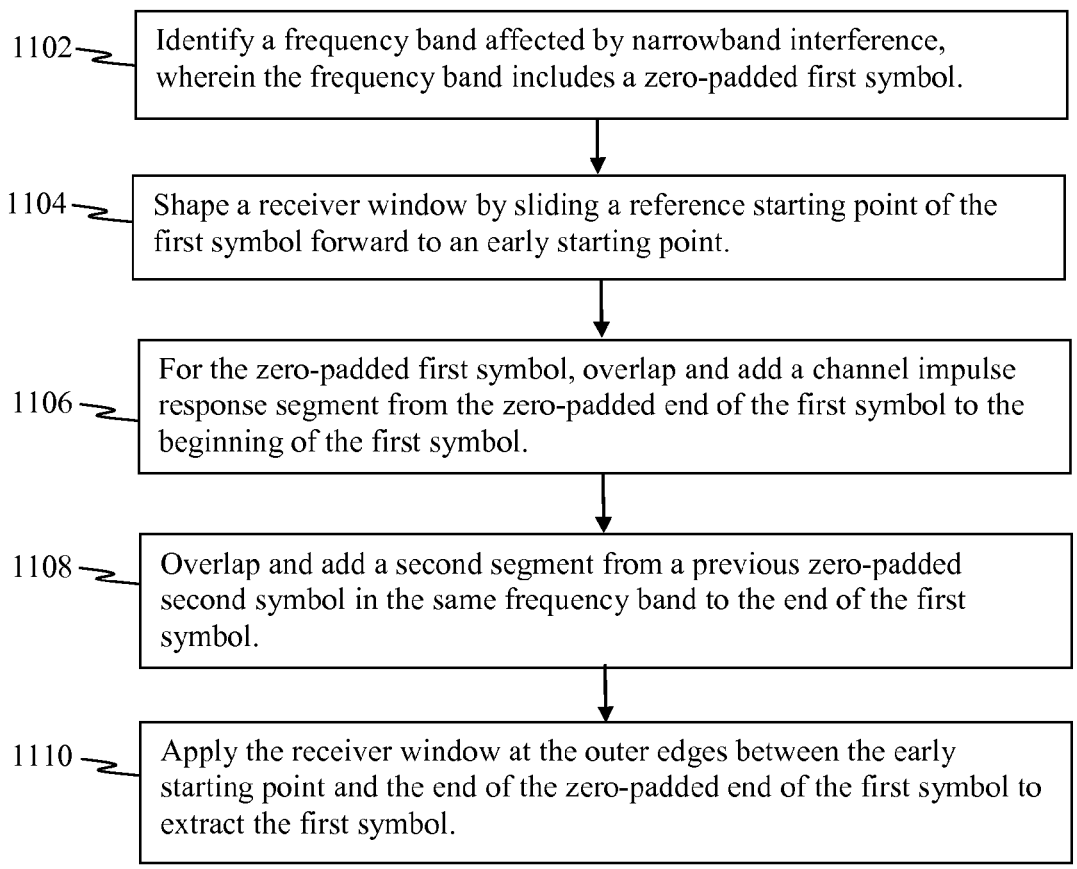
FIG. 11 illustrates a method operational on a receiver for shaping a window to extract a zero-padded symbol from a frequency band affected by side lobes of narrowband interference.

FIG. 11 illustrates a method operational on a receiver for shaping a window to extract a zero-padded symbol from a frequency band affected by side lobes of narrowband interference. A frequency band affected by narrowband interference is identified, wherein the frequency band includes a zero-padded first symbol 1102.

A receiver window is then shaped by sliding a reference starting point of the first symbol forward to a starting point 1104. For example, the starting point may be within the zero-padding segment for the previous (second) symbol received on the same frequency band.

For the zero-padded first symbol, a first segment from the zero-padded end of the symbol is copied, overlapped, and added to the beginning of the first symbol 1106. A second segment from the previous zero-padded second symbol in the same frequency band is similarly copied, overlapped and added to the end of the first symbol 1108.

The receiver window is then applied at the outer edges between the starting point and the end of the zero-padded end of the first symbol to extract the first symbol 1110.

Figure 12:
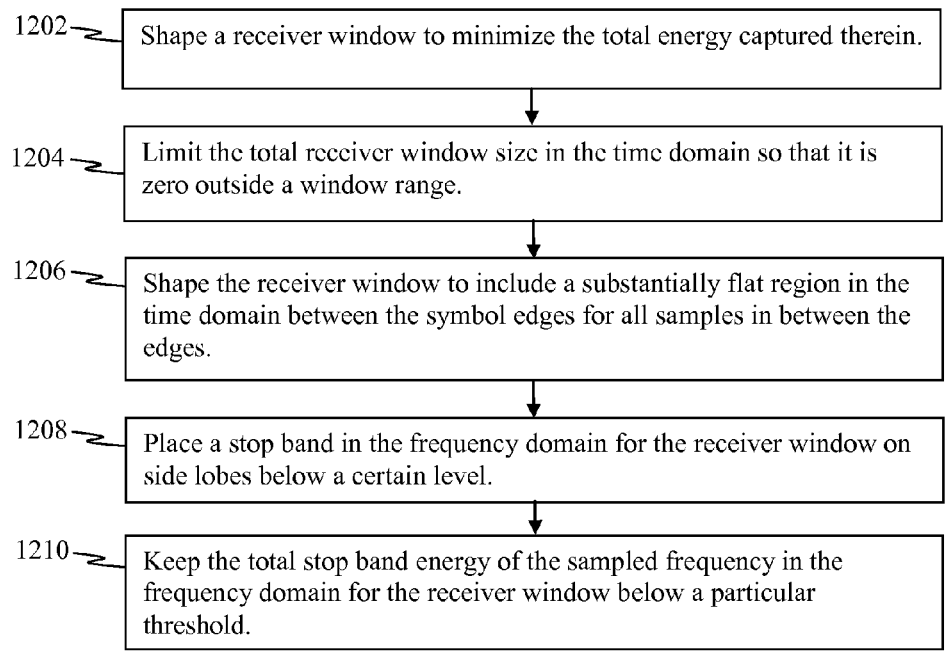
FIG. 12 illustrates a method for designing a receiver window to reduce or minimize the effects of side lobes from narrowband interference.
Figure 13:
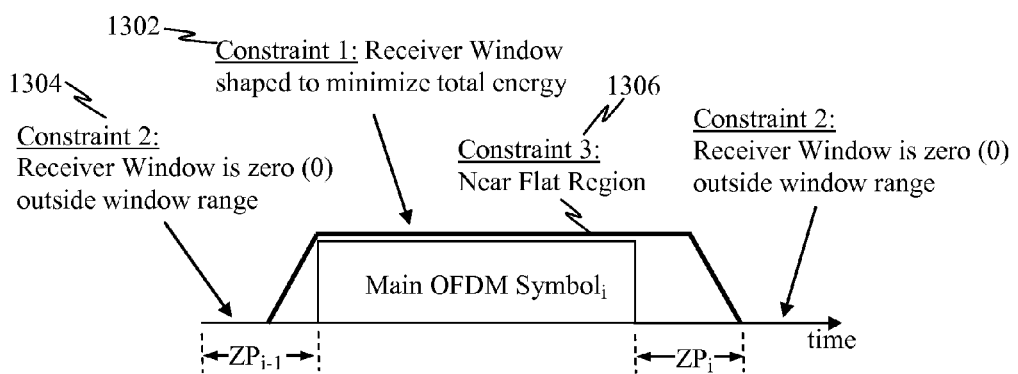
FIGS. 13 and 14 graphically illustrate examples of the time domain and frequency domain constraints, respectively, discussed in the method of FIG. 12.
Figure 14:
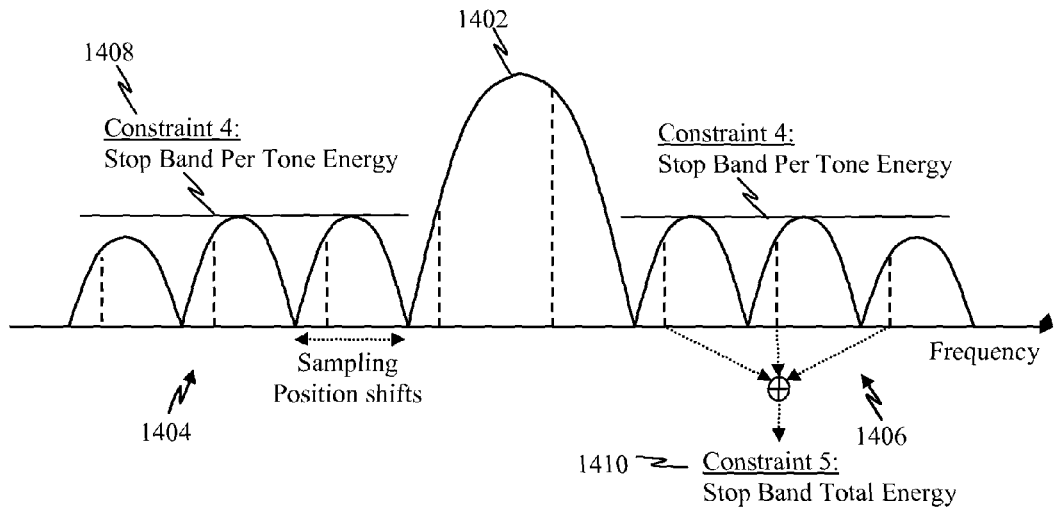

FIG. 12 illustrates a method for designing a receiver window to reduce or minimize the effects of side lobes from narrowband interference. The receiver window may be defined by N samples in the time domain (sampled at chip x1). In order to minimize the effects of side lobes (from narrowband interference), an optimum or improved receiver window for an affected frequency band may be defined according to various constraints. FIGS. 13 and 14 graphically illustrate examples of the time domain and frequency domain constraints, respectively, discussed in the method of FIG. 12.

FIG. 13 is a diagram illustrating a trapezoidal shaped receiver window in which the edges of a receiver window are shaped (either symmetrical or asymmetrical) to reduce and/or minimize the effects of NBI. By more slowly decaying the receiver window edges in the time domain, the interfering side lobes decay faster in the frequency domain. FIG. 14 illustrates a NBI spreading in the frequency domain along with the symbol sampling positions. The NBI spreads in frequency domain like a sinc function having an interfering center frequency 1402 and side lobes 1404 and 1406. The interfering center frequency 1402 (and other lobes that may have too much interference) may be filtered out so that the symbol samples within the center frequency 1402 are ignored. That is, the energy of the interfering center frequency 1402 may make it difficult to accurately sample the symbol at that frequency. By contrast, window shaping (especially at the edges of a receiver window) may reduce the energy of the side lobes 1404 and 1406 sufficiently to permit symbol sampling.

In a first constraint, the total energy in the receiver window is minimized 1302. That is, the receiver window is shaped in the time domain so as to minimize the total energy captured therein 1202.

In a second constraint, the total receiver window size is limited in the time domain so that it is zero outside the window range 1204 and 1304. That is, the receiver window has a finite length.

In a third constraint, the receiver window is shaped to include a substantially flat region in the time domain 1306 between symbol edges for all samples in between the edges 1206. For instance, the window is nearly flat (e.g., equal to one (1)) for all samples between the edges. This ensures that the sub-carriers in the frequency band remain untouched and no inter-carrier interference (ICI) is generated. However, it is also possible to define a nearly flat region by adding constraints on how much fluctuation is allowed in that region. The fluctuations may be sufficiently small to prevent significant ICI. This is designed similarly to a passband of a first impulse response (FIR) filter.

Fourth, a stop band per tone energy 1408 is placed in the frequency domain on side lobes below a certain level 1208. While the number of constraints is infinite since the frequency response is a continuous (analog), the frequency domain can be sampled at an acceptable sampling rate (e.g., 10 times). This means the NBI can be positioned at a corresponding number (e.g., 10) of different locations within one FFT bin.

Fifth, in the frequency domain, the total stop band energy 1410 of the sampled frequency band, at any sampling offset, is kept below a particular threshold 1210. In the case of a CP window (which performs shaping within the tone of interest), the nulls or zeros between side lobes fall in the same position (distance is the same between side lobes) for accurate sampling of a symbol. By contrast, in a ZP receiver window as described herein, the window shaping is performed outside the tones for the symbol of interest (e.g., by starting the receiver window early). Therefore, the nulls or zeros between side lobes (illustrated in FIG. 14) can vary or shift in position. Consequently, as a frequency band is sampled (the sampling rate may be the FFT sampling rate for the receiver), those samples are likely to fall at different positions of the side lobes. By placing the stop band on the total energy of the sampled frequency band (e.g., the total interference captured in the stop band is upper bounded), it constantly changes the positions of the nulls (distance between side lobes) and guarantees that the NBI shifts in frequency position. Hence, certain lucky positions are not privileged over other unlucky ones. This constraint on total stop band energy is the sum of the stop band per tone energy for each side lobe.

Figure 15:
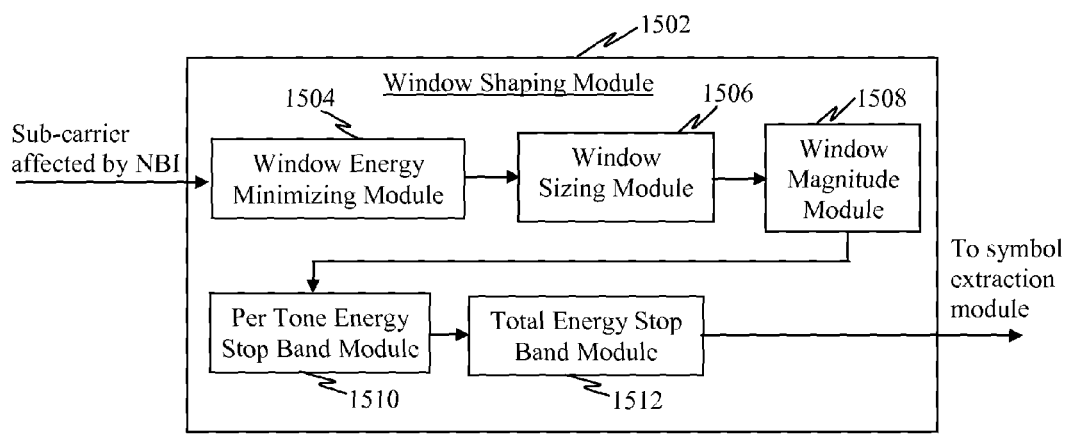
FIG. 15 is a block diagram illustrating a receiver window shaping module configured to shape a window to reduce or minimize the effects of side lobes from narrowband interference.

FIG. 15 is a block diagram illustrating a receiver window shaping module 1502 configured to shape a window to reduce or minimize the effects of side lobes from narrowband interference. For a sub-carrier affected by narrowband interference (NBI), a window energy minimizing module 1504 is configured to minimize the energy within a window for extracting a symbol from the sub-carrier. A window sizing module 1506 may be configured to limit the total receiver window size in the time domain so that it is zero outside a window range. A window magnitude module 1508 may be configured to shape the receiver window to include a flat region in the time domain between its edges for all samples in between the edges. This flat region may serve as a limit on the magnitude of the symbol within the window. A per tone energy stop band module 1510 may be configured to place a stop band in the frequency domain on energy for side lobes below a certain level. A total energy stop band module 1512 may be configured to keep the total stop band energy of the sampled frequency in the frequency domain below a particular threshold. Note that in various other implementations, the sequence or order in which the functions performed by the modules of the window shaping module 1502 may be reordered. For example, the functions performed by the window shaping module 1502 may be executed by a processor or processing circuit or other modules in a receiver (e.g., padding remover module 206 in FIG. 2).

According to yet another configuration, a circuit may be adapted to receive a wideband signal carrying a symbol spread across a plurality of sub-carriers of a frequency band. The same circuit, a different circuit, or a second section of the same or different circuit may be adapted to obtain a first receiver window for extracting the symbol, wherein the first receiver window has an early starting point before the start of the symbol. The circuit may also be adapted to shape of the first receiver window concentrates narrowband interference energy to a center frequency of the narrowband interference to reduce narrowband interference leakage to other sub-carriers in the frequency band. In addition, the same circuit, a different circuit, or a third section of the same or different circuit may be adapted to receiving a wideband signal carrying a symbol spread across a plurality of sub-carriers of a frequency band. Similarly, the same circuit, a different circuit, or a fourth section may be adapted to determine whether the frequency band is significantly affected by narrowband interference and/or extract the symbol using the first window if the frequency band is significantly affected by narrowband interference. In one example, the first receiver window may overlap with a previous window in the same frequency band. A fifth section of the same or a different circuit may be adapted to obtain a second receiver window for extraction of the symbol in the frequency band if the frequency band is unaffected by narrowband interference and/or extract the symbol using the second receiver window if the frequency band is unaffected by narrowband interference. In one example, the second receiver window may be non-overlapping with a previous receiver window in the same frequency band. One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, and/or functions illustrated in FIG. 1, 2, 3, 4, 5, 6, 7, 8, 9, 10, 11, 12, 13, 14 and/or 15 may be rearranged and/or combined into a single component, step, or function or embodied in several components, steps, or functions. Additional elements, components, steps, and/or functions may also be added. The apparatus, devices, and/or components illustrated in FIG. 1, 2, 6, and/or 15 may be configured to perform one or more of the methods, features, or steps described in FIG. 3, 4, 5, 8, 9, 10, 11, 12, 13 and/or 14. The novel algorithms described herein may be efficiently implemented in software, embedded hardware and/or a combination thereof.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems and/or configurations. For example, the receiver window shaping for zero-padded symbols may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing embodiments and/or configurations are merely examples and are not to be construed as limiting the claims. The description of the examples, embodiments, and configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method for receiver window shaping for symbol extraction, comprising:
   receiving a wideband signal carrying a symbol spread across a plurality of sub-carriers of a frequency band; and
   obtaining a first receiver window for extracting the symbol, wherein the first receiver window has a starting point before the start of the symbol, and includes:
      a first decaying edge between the starting point and the start of the symbol; and
      a second decaying edge in a zero padded portion of the symbol.

2. The method of claim 1, further comprising:
   determining whether the frequency band is significantly affected by narrowband interference; and
   extracting the symbol using the first window if the frequency band is significantly affected by narrowband interference,
   wherein the first receiver window overlaps with a previous window in the same frequency band.

3. The method of claim 2, further comprising:
   obtaining a second receiver window for extraction of the symbol in the frequency band if the frequency band is unaffected by narrowband interference; and
   extracting the symbol using the second receiver window if the frequency band is unaffected by narrowband interference,
   wherein the second receiver window is non-overlapping with a previous receiver window in the same frequency band.

4. The method of claim 1, wherein the shape of the first receiver window concentrates narrowband interference energy to a center frequency of the narrowband interference to reduce narrowband interference leakage to other sub-carriers in the frequency band.

5. The method of claim 1, wherein obtaining the first receiver window includes:
shaping the first receiver window as a trapezoid window; and
applying the first receiver window at the outer edges between the starting point and the end of a zero-padded portion of the symbol.

6. The method of claim 5, wherein obtaining the first receiver window further includes:
overlapping and adding a channel impulse response segment from the zero-padded portion of the symbol to the beginning of the symbol; and
overlapping and adding a second portion from a previous zero-padded symbol to the end of the symbol.

7. The method of claim 1, wherein the first receiver window overlaps a previous receiver window for the previous adjacent symbol in the frequency band.

8. The method of claim 1, wherein the wideband signal is an orthogonal frequency division multiplexing (OFDM) signal including an OFDM symbol spread across the plurality of sub-carriers of the frequency band.

9. The method of claim 1, wherein the frequency band includes a plurality of sequential zero-padded symbols, and the first receiver window overlaps a zero-padding portion of a previous symbol.

10. The method of claim 1, further comprising:
determining whether a first sub-carrier of the frequency band is significantly affected by a center frequency of the narrowband interference; and
ignoring the first sub-carrier if it has been significantly affected by the narrowband interference.

11. The method of claim 1, further comprising:
shaping the first receiver window to minimize the total energy captured therein.

12. The method of claim 1, further comprising:
limiting the first receiver window size in the time domain so that it is zero outside the first window range.

13. The method of claim 1, further comprising:
shaping the first receiver window to include a substantially flat region in the time domain between the symbol edges for all samples in between the edges.

14. The method of claim 1, further comprising:
placing a stop band in the frequency domain for the first receiver window on interference side lobes below a certain level.

15. The method of claim 1, further comprising:
keeping the total stop band energy of a sampled frequency in the frequency domain for the first receiver window below a particular threshold.

16. The method of claim 1, wherein the first decaying edge and second decaying edge are asymmetric.

17. A receiver module, comprising:
a serial to parallel converter configured to receive a wideband signal carrying a symbol spread across a plurality of sub-carriers of a frequency band; and
a window shaping module configured to obtain a first receiver window for extracting the symbol, wherein the window shaping module is configured so that the first receiver window has:
a starting point before the start of the symbol;
a first decaying edge between the starting point and the start of the symbol; and
a second decaying edge in a zero padded portion of the symbol.

18. The receiver module of claim 17, wherein the window shaping module is further configured to:
determine whether the frequency band is significantly affected by narrowband interference; and
extract the symbol using the first window if the frequency band is significantly affected by narrowband interference,
wherein the first receiver window overlaps with a previous window in the same frequency band.

19. The receiver module of claim 18, wherein the window shaping module is further configured to:
obtain a second receiver window for extraction of the symbol in the frequency band if the frequency band is unaffected by narrowband interference; and
extract the symbol using the second receiver window if the frequency band is unaffected by narrowband interference,
wherein the second receiver window is non-overlapping with a previous receiver window in the same frequency band.

20. The receiver module of claim 17, wherein the window shaping module is further configured so that the shape of the first receiver window concentrates narrowband interference energy to a center frequency of the narrowband interference to reduce narrowband interference leakage to other sub-carriers in the frequency band.

21. The receiver module of claim 17, wherein the window shaping module is further configured to:
shape the first receiver window as a trapezoid window;
overlap and add a channel impulse response segment from a zero-padded portion of the symbol to the beginning of the symbol;
overlap and add a second portion from the previous zero-padded symbol to the end of the symbol; and
apply the first receiver window at the outer edges between the starting point and the end of the zero-padded portion of the symbol.

22. The receiver module of claim 17, wherein obtaining the first receiver window, the window shaping module is further configured to:
shape the first receiver window to minimize the total energy captured therein;
limit the first receiver window size in the time domain so that it is zero outside the first window range;
shape the first receiver window to include a substantially flat region in the time domain between the symbol edges for all samples in between the edges;
place a stop band in the frequency domain for the first receiver window on interference side lobes below a certain level; and
keep the total stop band energy of a sampled frequency in the frequency domain for the first receiver window below a particular threshold.

23. The receiver module of claim 17, wherein the window shaping module is further configured to:
shape the first receiver window as a trapezoid window; and
apply the first receiver window at the outer edges between the starting point and the end of a zero-padded portion of the symbol.

24. The receiver module of claim 23, wherein the window shaping module is further configured such that obtaining the first receiver window further includes:
overlapping and adding a channel impulse response segment from the zero-padded portion of the symbol to the beginning of the symbol; and
overlapping and adding a second portion from a previous zero-padded symbol to the end of the symbol.

25. The receiver module of claim 17, wherein the wideband signal is an orthogonal frequency division multiplexing (OFDM) signal including an OFDM symbol spread across the plurality of sub-carriers of the frequency band.

26. A receiver module, comprising:
means for receiving a wideband signal carrying a symbol spread across a plurality of sub-carriers of a frequency band;
means for obtaining a first receiver window for extracting the symbol, such that the first receiver window has:
a starting point before the start of the symbol;
a first decaying edge between the starting point and the start of the symbol; and
a second decaying edge in a zero padded portion of the symbol.

27. The receiver module of claim 26, wherein means for obtaining a first receiver window comprises means for obtaining the first receiver window so that the shape of the first receiver window concentrates narrowband interference energy to a center frequency of the narrowband interference to reduce narrowband interference leakage to other sub-carriers in the frequency band.

28. The receiver module of claim 26, further comprising:
means for shaping the first receiver window as a trapezoid window;
means for overlapping and adding a channel impulse response segment from a zero-padded portion of the symbol to the beginning of the symbol;
means for overlapping and adding a second portion from the previous zero-padded symbol to the end of the symbol; and
means for applying the first receiver window at the outer edges between the starting point and the end of the zero-padded portion of the symbol.

29. The receiver module of claim 26, further comprising:
means for shaping the first receiver window to minimize the total energy captured therein;
means for limiting the first receiver window size in the time domain so that it is zero outside the first window range;
means for shaping the first receiver window to include a substantially flat region in the time domain between the symbol edges for all samples in between the edges;
means for placing a stop band in the frequency domain for the first receiver window on interference side lobes below a certain level; and
means for keeping the total stop band energy of a sampled frequency in the frequency domain for the first receiver window below a particular threshold.

30. A circuit for improving capture of a wideband signal, wherein the circuit is adapted to:
receive a wideband signal carrying a symbol spread across a plurality of sub-carriers of a frequency band; and
obtain a first receiver window for extracting the symbol, wherein the first receiver window has a starting point before the start of the symbol, and includes:
a first decaying edge between the starting point and the start of the symbol; and
a second decaying edge in a zero padded portion of the symbol.

31. The circuit of claim 30, wherein the circuit is adapted to obtain the first receiver window such that the shape of the first receiver window concentrates narrowband interference energy to a center frequency of the narrowband interference to reduce narrowband interference leakage to other sub-carriers in the frequency band.

32. A non-transitory computer-readable medium having stored thereon processor-executable instructions for receiver window shaping for symbol extraction, which when executed by a processor causes the processor to:
receive a wideband signal carrying a symbol spread across a plurality of sub-carriers of a frequency band; and
obtain a first receiver window for extracting the symbol, wherein the first receiver window has a starting point before the start of the symbol, and includes:
a first decaying edge between the starting point and the start of the symbol; and
a second decaying edge in a zero padded portion of the symbol.

33. The non-transitory computer-readable medium of claim 32, wherein the stored processor-executable instructions when executed by a processor causes the processor to:
determine whether a first sub-carrier of the frequency band is significantly affected by a center frequency of the narrowband interference; and
ignore the first sub-carrier if it has been significantly affected by the narrowband interference.

* * * * *